United States Patent
Baccman

Patent Number: 5,458,401
Date of Patent: Oct. 17, 1995

[54] VEHICLE WHEEL APPLIQUE SYSTEM

[75] Inventor: Bjorn Baccman, Hendersonville, Tenn.

[73] Assignee: Del-Met Corporation, Hendersonville, Tenn.

[21] Appl. No.: 97,383

[22] Filed: Jul. 26, 1993

[51] Int. Cl.⁶ .................................................. B60B 7/06
[52] U.S. Cl. ................................. 301/37.43; 301/37.1
[58] Field of Search ...................... 301/37.1, 37.42, 301/37.43, 108.1, 64.2, 37.27; 156/230, 233, 278, 331.1, 331.8

[56] References Cited

U.S. PATENT DOCUMENTS

| | | |
|---|---|---|
| 3,669,501 | 6/1972 | Derleth . |
| 3,726,566 | 4/1973 | Beith ..................... 301/37.1 |
| 3,756,658 | 9/1973 | Adams . |
| 3,860,295 | 1/1975 | Beisch . |
| 4,169,006 | 9/1979 | Matsubara et al. ............ 156/331.8 X |
| 4,248,654 | 2/1981 | Gude et al. ............................ 156/331.8 |
| 4,295,685 | 10/1981 | Spisak . |
| 4,441,762 | 4/1984 | Segal . |
| 4,511,183 | 4/1985 | Spiegel et al. . |
| 4,529,772 | 7/1985 | Druschke et al. ............... 156/331.8 X |
| 4,682,820 | 7/1987 | Stalter . |
| 4,790,605 | 12/1988 | Stalter, Sr. . |
| 5,031,966 | 7/1991 | Oakey ............................. 301/37.43 X |
| 5,039,172 | 8/1991 | Krieger ............................. 301/37.1 |
| 5,058,959 | 10/1992 | Miles et al. . |
| 5,143,426 | 9/1992 | Todd . |
| 5,255,874 | 10/1993 | Roussel ............................ 301/37.1 X |

Primary Examiner—Russell D. Stormer
Attorney, Agent, or Firm—Natter & Natter

[57] ABSTRACT

A metal applique is configured to conform to the shape of the outer face of a stock vehicle wheel. The face of the applique is finished with a selected surface treatment such as chrome plate, brushed metal, paint, machining etc. A stratum comprising an acrylic adhesive coated foam core is adhered to the inner face of the applique. The applique is bonded to the outer face of the vehicle wheel after removing a release film to expose the acrylic adhesive. The bond is achieved by registering the applique with the face of the wheel and applying compressive force.

20 Claims, 4 Drawing Sheets

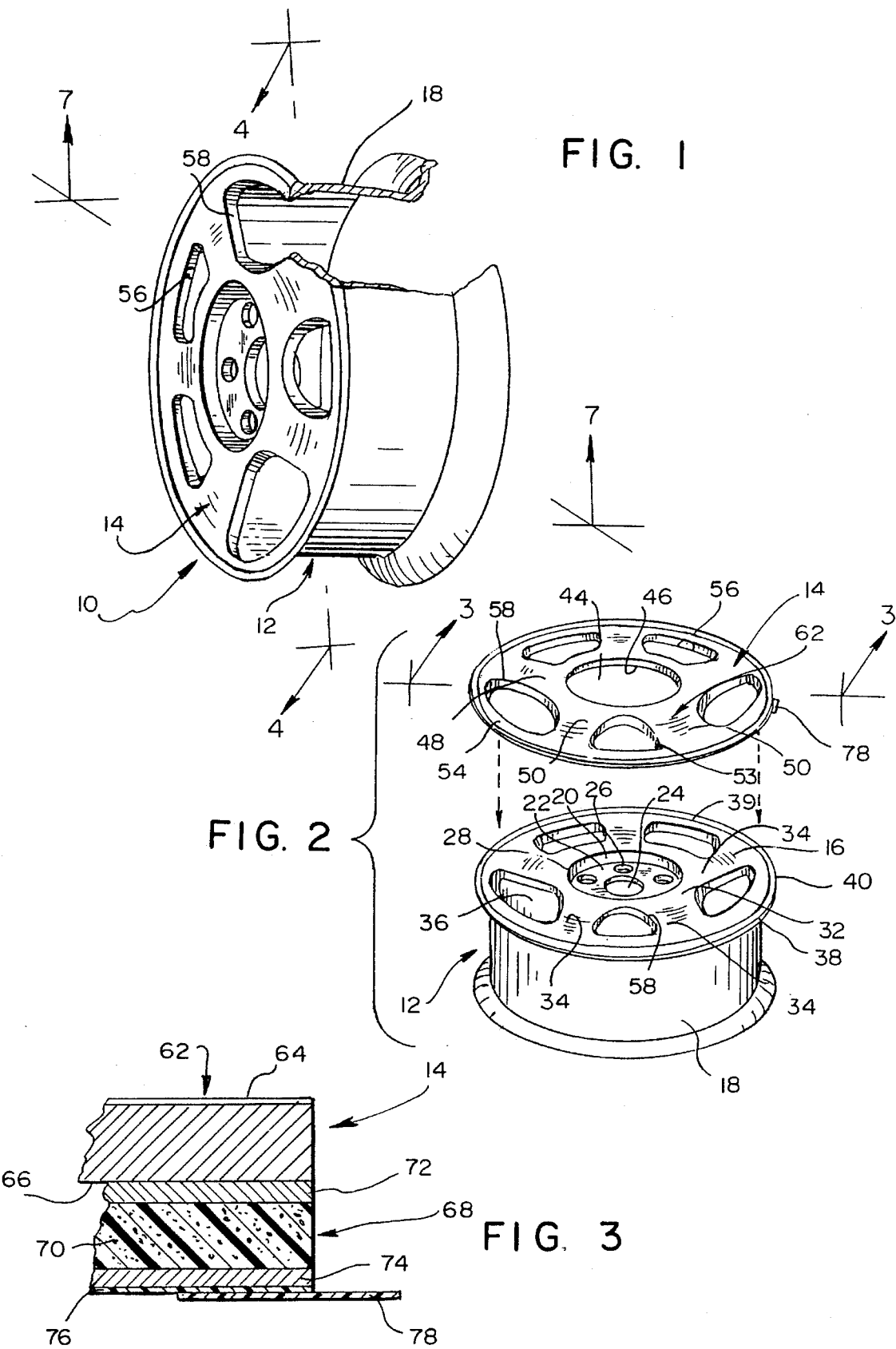

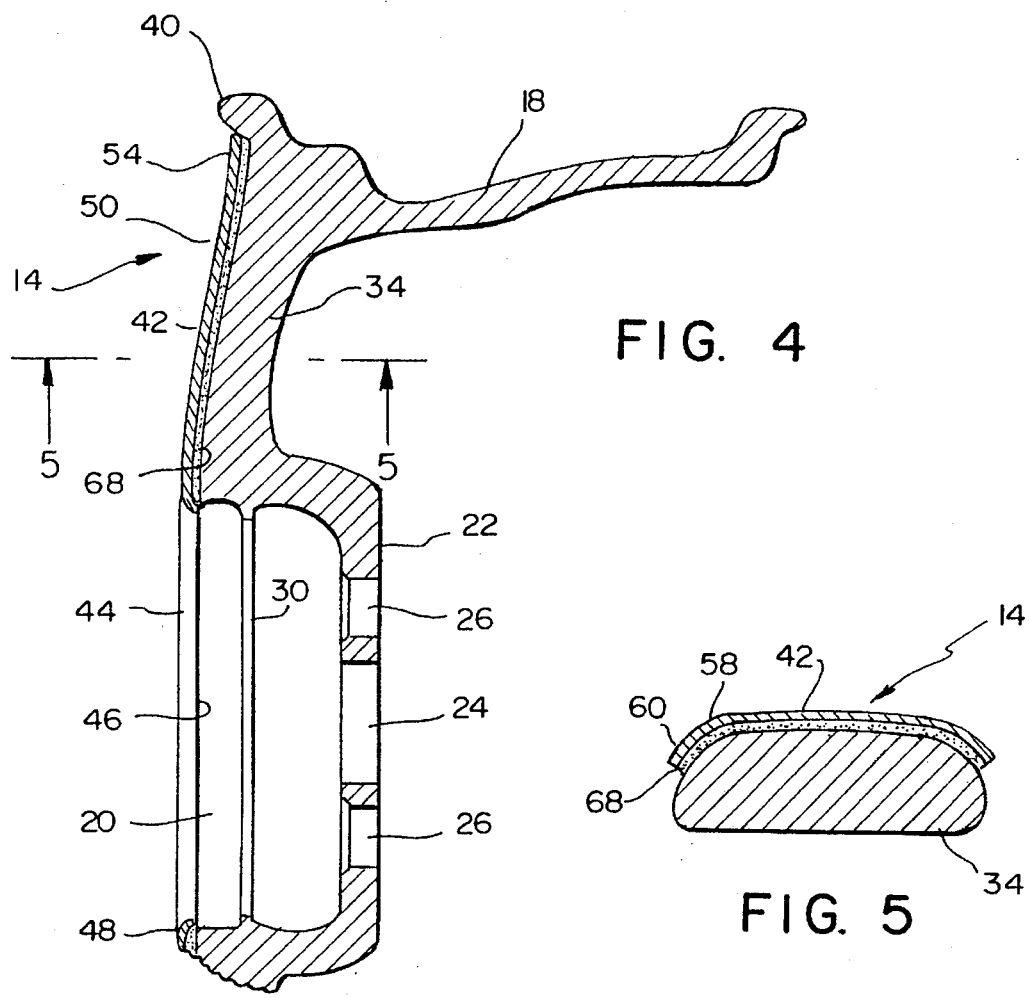
FIG. 4
FIG. 5
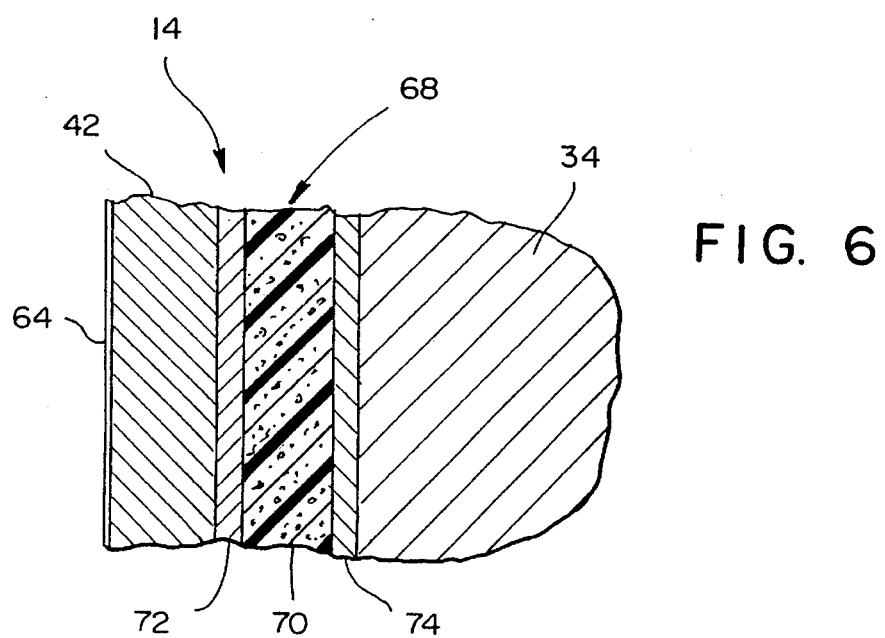
FIG. 6

VEHICLE WHEEL APPLIQUE SYSTEM

BACKGROUND OF TEE INVENTION

1. Field of the Invention

This invention relates generally to decorative vehicle wheels and more particularly to a system for providing a stock vehicle wheel with a number of available permanent finishes.

2. Related History

Although wheel covers have continued to play a significant role with respect to providing a pleasant and stylized appearance to vehicle wheels in both new car and aftermarket applications, there has been a trend in new car sales to equip vehicles with cast metal, such as aluminum, stylized vehicle wheels. Such trend has increased to the extent that stylized cast metal wheels have become standard equipment not only on luxury cars but, in addition, on moderately priced vehicles.

Dynamic wheel balancing has been easier to achieve and maintain with cast metal wheels for the reason that compensation was not required for the additional weight of a wheel cover. Further, conventional wheel covers were subject to inadvertent dislodgement and consequent loss and, in addition, to loss by theft or vandalism.

While there has been a decrease in the number of available vehicle models, individual customer preferences and the availability of options has been a consideration in new vehicle marketing and sales promotion. Unfortunately, when cast metal wheels were standard or optional equipment with a specific model vehicle, only one surface treatment for the wheel was available. Such limitation was a consequence of the costs involved in acquiring and maintaining inventories of numerous wheels for a particular vehicle model, each with the same dimensions and structure but with different surface treatments.

SUMMARY OF THE INVENTION

A composite cast metal wheel includes an applique bonded to the face of the wheel. The applique is formed of a metal panel dimensioned and contoured to cover the face of a stock vehicle wheel. The panel carries one of several available surface treatments such as chrome plate, brushed metal, machining, paint, etc. A stratum comprising a double faced acrylic adhesive coated foam core is employed between the inner surface of the panel and the face of the wheel to permanently bond the panel to the wheel.

Individual appliques formed of panels having various surface treatments with the stratum adhered to the inner surface of the panel and with an outer adhesive substratum having a release film overlay may be stocked at a vehicle assembly plant, an automobile dealer, a wheel manufacturer or a tire dealer. When a wheel with a particular surface treatment is required, an applique having the desired surface treatment is selected, the release film is removed, exposing the adhesive substratum, the applique is registered with the face of the wheel and compressive force is applied to permanently bond the applique to the wheel.

From the foregoing compendium, it will be appreciated that it is an aspect of the present invention to provide a vehicle wheel applique system of the general character described which is not subject to the disadvantages of the related history aforementioned.

A feature of the present invention is to provide a vehicle wheel applique system of the general character describes which permits new vehicle customer selection of wheel finishes.

To provide a vehicle wheel applique system of the general character described which enables customization of wheel finishes in an efficient manner, suitable for low cost mass production assembly techniques is a consideration of the present invention.

Another feature of the present invention is to provide a vehicle wheel applique system of the general character described whereby any of a number of various wheel surface treatments may be permanently bonded to a stock vehicle wheel.

Another aspect of the present invention is to provide a vehicle wheel applique system of the general character described wherein customer selected vehicle wheel surface treatments may be permanently applied along a vehicle assembly line.

Yet a further aspect of the present invention is to provide a vehicle wheel applique system of the general character described which includes a sheet metal applique contoured and dimensioned to overlie the face of a wheel and having an adhesive suitable for permanent bonding of the applique to the face of a vehicle wheel.

A still further aspect of the present invention is to provide a vehicle wheel applique system of the general character described whereby a composite vehicle wheel including a stock wheel and a metal applique permanently bonded to the face of the wheel is easily constructed and assembled.

Further aspects, features, and considerations of the present invention in part will be obvious and in part will be pointed out hereinafter.

With these ends in view, the invention finds embodiment in certain combinations of elements, arrangements of parts and series of steps by which the said aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings, in which is shown one of the various possible exemplary embodiments of the invention, FIG. 1 is an isometric illustration of a composite wheel constructed in accordance with and embodying the invention with a metal applique having a desired surface treatment; the applique being permanently bonded to the face of the wheel, and with portions of the wheel and applique broken away;

FIG. 2 is a perspective view of an assembly stage pursuant to the invention and showing by way of example, a work station of an automotive manufacturing facility and illustrating an applique prior to bonding to the face of a stock wheel;

FIG. 3 is a greatly enlarged scale fragmentary sectional view through an edge portion of the applique the same being taken substantially along the plane 3—3 of FIG. 2 and showing a substrate bonded to the underside of the applique;

FIG. 4 is an enlarged scale sectional view through the composite wheel, including a spoke portion thereof, the same being taken substantially along the plane 4—4 of FIG. 1;

FIG. 5 is a sectional view through the spoke portion and the applique, the same being taken substantially along the line 5—5 of FIG. 4;

FIG. 6 is a greatly enlarged fragmentary sectional view through an edge portion of the wheel and applique and showing a composite stratum which bonds the applique to the wheel;

DESCRIPTION OF THE PREFERRED EMBODIMENT

Figure 7:
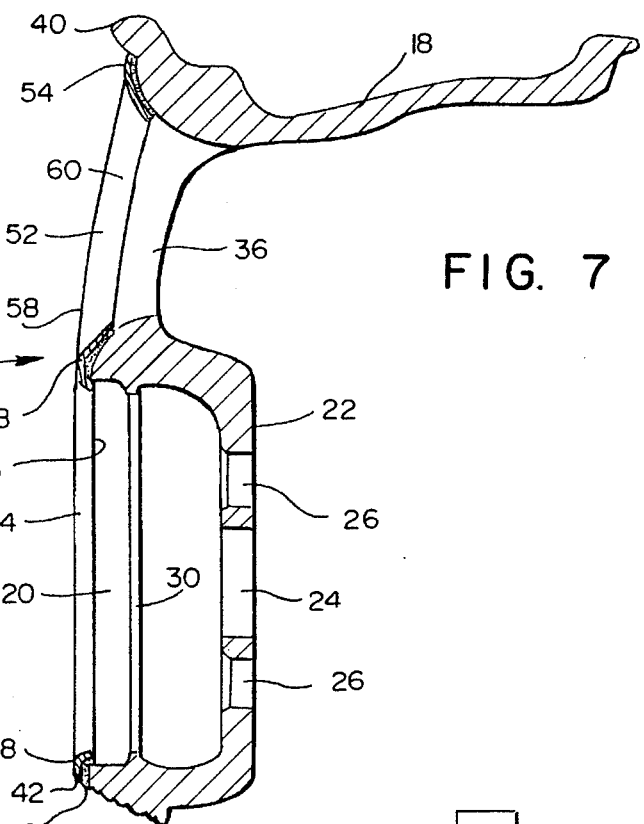
FIG. 7 is an enlarged scale fragmentary sectional view through the composite wheel including a vent portion thereof, the same being taken substantially along the plane 7—7 of FIG. 1.

With reference now in detail to the drawings wherein the reference numeral 10 denotes generally a composite wheel constructed in accordance with and embodying the invention, it should be noted that the composite wheel 10 comprises a stock vehicle wheel 12 and an applique 14 which is permanently bonded to the face of the wheel and which carries a desired surface treatment. The stock wheel 12 (illustrated in FIG. 2) is formed of an outer wheel face 16 and a wheel rim 18. The wheel 12 also includes an axially central well 20 at the base of which is a generally planar hub 22 which is transverse to the axis of the wheel 12. The hub 22 carries a central aperture 24 and a plurality of spaced lug openings 26, with each lug opening 26 having a chamfered end for seating a lug nut.

The axially outer surface of the well 20 is defined by a circular mouth 28. The well mouth 28 is normally covered by a cap (not shown). Spring retainers or teeth extend from the cap and engage an annular rib 30 formed on the wall of the well to maintain the cap in place.

From the mouth 28, the wheel face 16 extends radially outwardly toward the wheel rim 18. The face 16 includes an annular web portion 32 and a plurality of radial spokes 34 which are separated by vent openings 36. The spokes 34 are joined, at their radially distal ends by an annular ring 38 of the wheel rim 18, With the ring 38 bordered by an axially outwardly projecting peripheral lip 40.

The stock wheel 12 may be cast of a suitable, preferably light weight metal, such as aluminum, with the wheel face 16 being machined to provide a relatively smooth surface, suitable for mounting the stock wheel 16 on a vehicle with only a clear protective finish such as an acrylic thermosetting powder coating available from the Glidden Company under the designation 158-C-112.

Pursuant to the invention, the wheel face 16 may have the applique 14 permanently bonded to the clear coat or directly to the metal face surface as an overlay. The applique 14 comprises a panel 42, preferably formed of a cold rolled steel or stainless steel having a thickness in the order of 0.5 mm (0.02 inch) or aluminum alloy having a thickness in the order of 0.8 mm (0.03 inch).

The panel 42 is configured to conform to the shape of the wheel face 16 and includes a central opening 44 having an axially inward lip 46 dimensioned to be received in the mouth 28 of the well 20. Extending radially from the central opening 44, the panel 42 includes an annular web 48 dimensioned to conform with and overlie the wheel web 32, a plurality of radial spokes 50, dimensioned to overlie the wheel spokes 34, a plurality of vent openings 52, registered with the wheel vent openings 36 and an annular ring 54 dimensioned to overlie the annular ring 38 of the wheel. A notch or aperture 56 is formed in the ring 54 for registration with a valve stem aperture 39 of the wheel rim. From an examination of FIGS. 4 and 7 it will be noted that the peripheral edge of the panel extends radially up to the rim lip 40 and does not cover or overlie the lip 40.

The panel 42 is preferably die cut from a blank comprising a sheet of the metal having the specified thickness and is contoured to match the axial profile of the wheel face 16. In areas surrounding the vent openings 52, the panel 42 is axially inwardly bent along a fold 58 to provide a throat 60 which covers axially interior visible portions of the web 32, spokes 34 and the annular ring 38.

An outer face 62 of the panel 42 receives any one of a number of surface treatments 64. For example, if the panel 42 is formed of cold rolled steel, a surface treatment 64 such as a layer of paint may be applied to match or coordinate with the paint color of the vehicle. Alternately, the surface treatment 64 may comprise a chrome plate. If the panel 42 is formed of stainless steel, the surface treatment 64 may comprise either a polished or brushed surface and, in the event aluminum material is utilized for the panel 42, the face 62 may be provided with a machined surface 64. All surface treatments may include an overlay of protective clear coat, e.g. 158-C-112.

An inner face 66 of the panel is bonded to a stratum 68 comprising an acrylic foam core 70, a proximal substratum coat 72 of acrylic adhesive entirely covers the core foam 70 and a distal substratum coat 74 entirely covers the distal surface of the core 70. The proximal substratum coat 72 is placed in contact with the inner face 66 of the panel 42.

As illustrated in FIG. 3, the distal substratum coat 74 is covered by a release film 76 which includes, in a discrete peripheral edge area, a pull tab 78 for facilitating stripping the release film from the distal substratum coat.

Although the pull tab 78 illustrated in the exploded view of FIG. 2, in actuality, when the applique 14 is about to be bonded to the wheel face 16 as depicted in FIG. 2, the release film 76 has been stripped from the distal substratum coat 74.

The stratum 68 may comprise an acrylic foam tape available from 3M company, Automotive Systems Division, St. Paul, Minn. under the designation Y-5314. Such acrylic foam tape comprises a core of acrylic foam covered by a proximal substratum coat of DS4 acrylic adhesive, a distal substratum coat of AR-7 acrylic adhesive and a release film of polyethylene with a total tape thickness in the order of 0.8 mm (0.30 inches).

Different acrylic adhesives are employed for the proximal substratum coat and the distal substratum coat. The proximal substratum coat adhesive may have a stronger bond strength than the distal substratum coat so that if damage to the surface of the applique occurs, the applique can be removed from the wheel without destroying the wheel. Alternate foam core adhesive may be utilized for the proximal and distal substratum coats or the same adhesive may be used for both coats. Further, an alternate foam core adhesive system or an alternate bonding system may be selected.

Referring again to FIG. 2 which illustrates a typical work station at which the stock wheel 12 receives its selected applique 14, it will be seen that the applique 14 is registered with the wheel face 16. Prior to such registration step, the pull tab 78 is employed to remove the release film 76. Thereafter, the applique with its exposed distal substratum coat 74 is placed in intimate contact with the wheel face 16 and compressive force is applied.

Preferably, the compressive force is initially applied at the central opening 44 and then extended progressively outwardly to expel any air which may otherwise become entrapped between the stratum and the wheel face. When Y-5134 acrylic foam tape is utilized for the stratum 68, a permanent bond between the applique and the wheel face is achieved within a seventy-two hour dwell or cure time.

Figure 8:
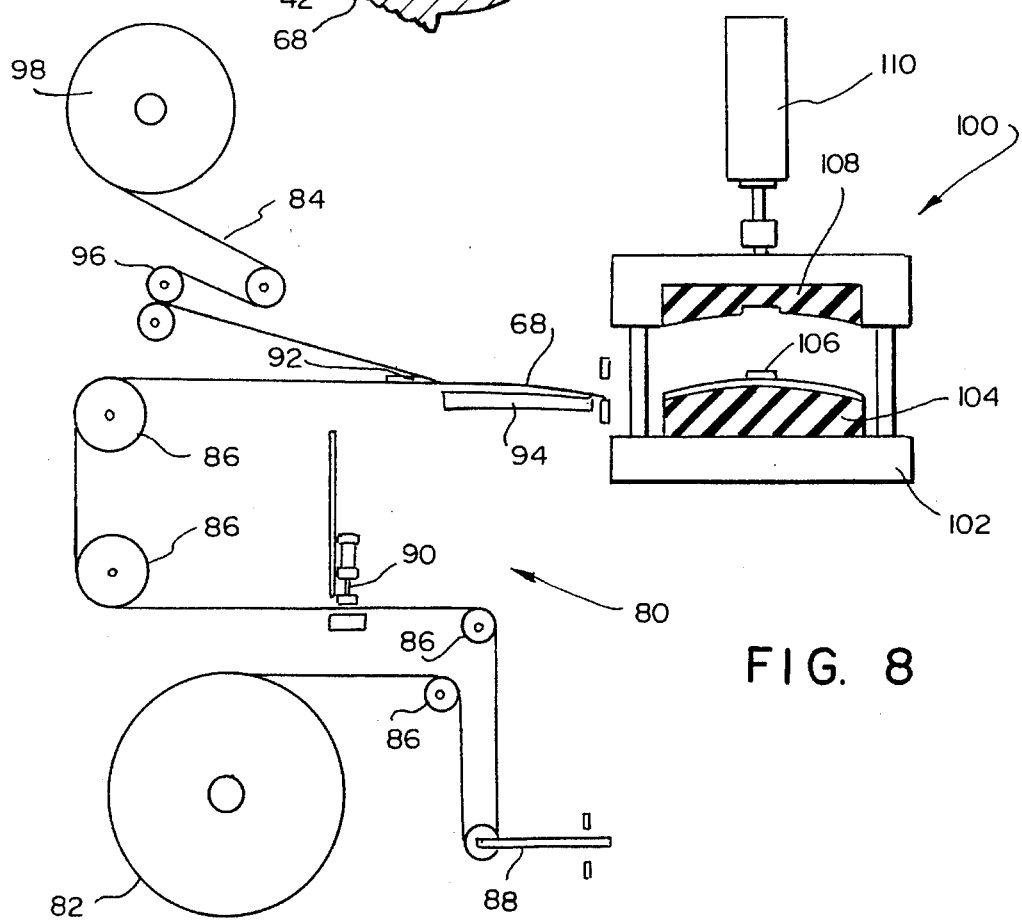
FIG. 8 is schematized illustration of a typical apparatus employed for sequentially transporting a plurality of strata to a work station and an apparatus for adhering each stratum to the underside of an applique panel to form an applique.
Figure 9:
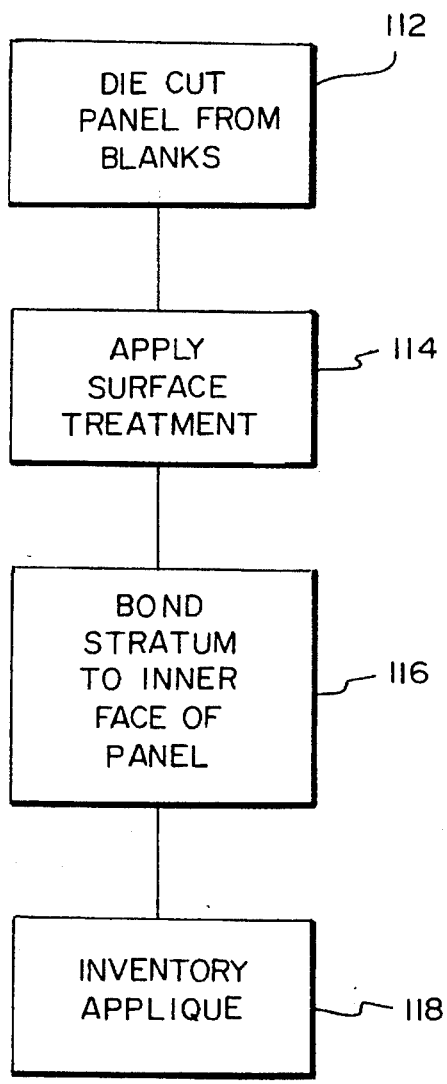
FIG. 9 comprises a flow chart depicting various steps employed in fabricating appliques in accordance with the invention.

With reference now to FIG. 8, a typical delivery apparatus 80 for sequentially transporting a plurality of strata 68 for assembly of appliques is illustrated. The delivery apparatus 80 includes a supply roll 82 of strata. Each stratum has been die cut to conform to the shape of the inner surface 66 of the panel 42 and is positioned on a carrier web 84 of release film with the stratum release film 76 facing outward. The web 84, together with the strata 68 carried thereon are fed from the supply roll 82 along a path defined by a plurality of idler rollers 86 and a tensioning roller 88 past a tab bonding station 90.

At the tab bonding station, the pull tabs 78 are dielectrically, thermally or adhesively bonded to the release film 76 in a position projecting beyond the peripheral edge of the release film 76 and the stratum 68 as illustrated in FIG. 3. From the tab bonding station 90, the web 84 extends along a path defined by a further pair of idler rollers 86 to a planar peel bar 92.

The peel bar 92 is positioned in front of a stratum delivery table 94. The web 84 is pulled sharpwardly rearwardly from the trailing edge of the peel bar 92 to strip each stratum 68 from the web and deposit the stratum on the delivery table 94. A nip roller arrangement 96 is provided for pulling the web 84 rearwardly from the peel bar 92. The web 84 of release film is then wound on a take-up roll 98.

From the table 94 the stratum 68 is delivered to a press 100 which includes a platen 102, end a contoured platen fixture 104 of relatively resilient material, such as rubber. The fixture 104 is provided with the configuration of the wheel face 16. The stratum 68 is placed on the platen fixture 104 with the release film 76 facing downwardly and the exposed proximal adhesive substratum coat 72 facing upwardly.

Thereafter, a panel 42 is placed on a retractable central post 106 which maintains its inner face 66 spaced from the proximal adhesive substratum coat 72. The panel 42 is registered with the stratum and a contoured cope fixture 108 is lowered through the use of a pneumatic cylinder 110. Simultaneously with the lowering of the cope fixture 108 or prior thereto, the post 106 is retracted downwardly. The pneumatic cylinder 110 causes the cope fixture to exert suitable compressive force on the panel 42 and the registered stratum 68 to permanently bond the stratum to the panel, thus forming an applique 14.

Figure 10:
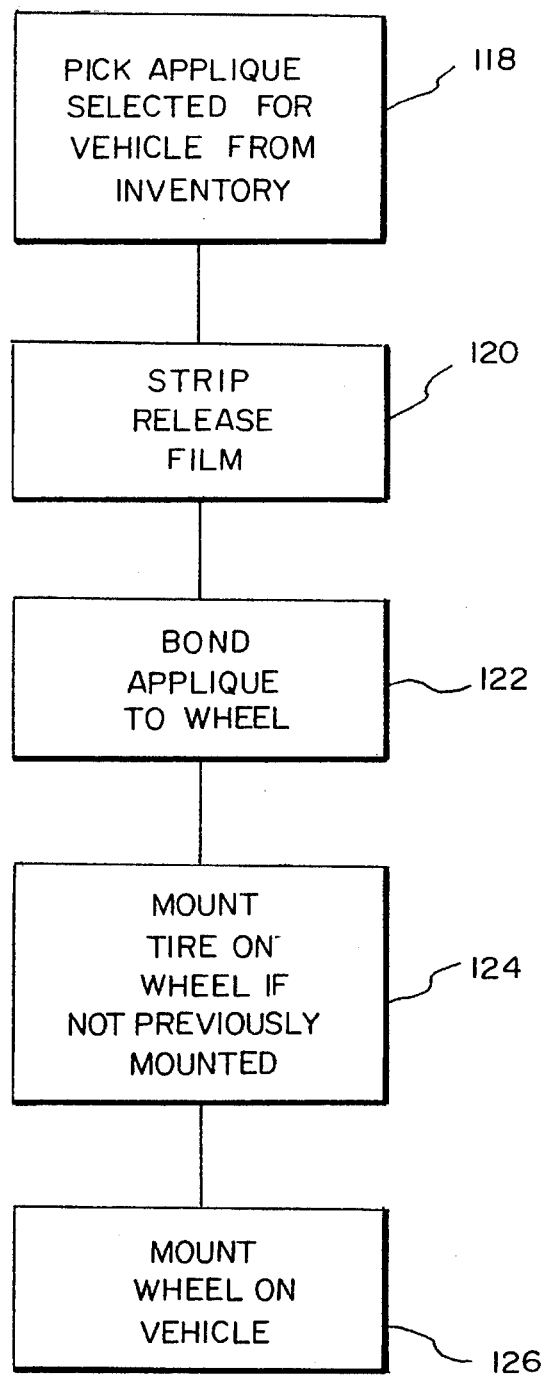
FIG. 10 comprises a flow chart depicting steps employed for assembling and mounting composite wheels on a typical vehicle production line in accordance with the invention.

Referring now to FIG. 10 wherein there is depicted a flow chart showing the various steps which may be employed in fabricating appliques 14 pursuant to the invention, it should be noted that initially, individual panels 42 are die cut from metal blanks as depicted in a box 112. As indicated in box 114, a suitable surface treatment is applied to the face 62 of each panel. In certain instances, however, the surface treatment may be applied to the blanks prior to die cutting the panels from the blanks.

The next sequential step in fabricating appliques comprises the bonding of a stratum to the inner face 66 of a panel, as depicted in a box 116. Such step may be accomplished utilizing the stratum delivery apparatus 80 and the press 100. Upon completion of the bonding step as indicated in a box 116, the finished appliques 14 are shipped to a facility where assembly of the composite wheel 10 will be completed and placed in inventory at such facility, as indicated in a box 118, awaiting selection in the fabrication of a composite wheel 10.

In FIG. 10 there is depicted the steps for completing the assembly of a composite wheel 10 from a stock wheel 12 and an applique 14 as may take place on a typical vehicle production line, it being understood, however, that the assembly of a composite wheel 10 need not necessarily occur in conjunction with a vehicle production line and could take place at the facilities of an automobile dealer, a tire dealer, Wheel dealer, wheel manufacturer or at the facilities of the applique manufacturer.

In accordance with the invention, in a vehicle production line environment, the initial step in fabricating a composite wheel 10 is to pick the appliques having the surface treatment specified for the assigned vehicle on the line, as depicted in a box 118. Thereafter, the release film 76 is stripped from the distal substratum coat 74, as depicted in a box 120.

The applique and the wheel face 16 are thereafter registered and the applique is bonded to the wheel by the application of compressive force, as indicated in a box 122.

In the event a tire has not been mounted on the wheel, the next sequential step in production is to mount and balance a tire on the composite wheel, as indicated in a box 124. The final step is to mount each composite wheel to the assigned vehicle as indicated in a box 126. A companion cap having a matching surface treatment may be mounted to cover the wheel well mouth 28 at this time or the caps may be mounted by the automobile dealer prior to delivery to the customer.

As previously mentioned, the acrylic adhesive coatings of the Y-5314 distal substratum coat may take up to 72 hours of dwell time to cure and provide a full strength bond. Since the applique does not encounter stresses which would tend to peel, lift or move the applique relative to the wheel during the steps of tire mounting and mounting of the composite wheel on the vehicle, curing of the acrylic adhesive may take place with the wheels mounted on the vehicle prior to delivery to the customer. Alternately, the dwell time may occur at the vehicle production plant after the bonding step and prior to mounting of the tire or mounting the composite wheel on the vehicle.

Thus, it will be seen that there is provided a vehicle wheel applique system which achieves the various aspects, features and considerations of present invention and which is well suited to meet the conditions of practical usage.

Since various possible embodiments might be made of the present invention and various changes might be made in the exemplary embodiment set forth herein without the departing from the spirit of the invention, it is to be understood that all matter herein described or shown in the accompanying drawings is to be interpreted as illustrative and not in a limiting sense.

Having thus described the invention, there is claimed as new and desired to be secured by Letters Patent:

1. A composite decorative vehicle wheel, the wheel comprising a hub, a rim for mounting a vehicle tire, the rim including an annular ring and an axial peripheral lip, and structural means interconnecting the hub and the rim, the structural means and the annular ring defining a wheel face surface, the composite wheel further including sheet applique means, the sheet applique means covering the entire wheel face surface and not covering the axial peripheral lip, the sheet applique means having an outer face and a surface treatment applied to the outer face, the sheet applique means further including an inner face and foam stratum means having an acrylic adhesive for permanently bonding substantially the entire inner face of the sheet applique means to the wheel face surface.

2. A composite decorative vehicle wheel as constructed in accordance with claim 1 wherein the sheet applique means is formed of metal having a thickness in the order of 0.5 mm to 0.8 mm.

3. A composite decorative vehicle wheel as constructed in accordance with claim 1 wherein the foam stratum means further comprises an acrylic foam core, a proximal substratum positioned between the core and the sheet applique means and a distal substratum positioned between the core and the wheel face.

4. A composite decorative vehicle wheel as constructed in accordance with claim 3 wherein the proximal and the distal substratum each comprise an acrylic adhesive.

5. A composite decorative vehicle wheel as constructed in accordance with claim 4 wherein the acrylic adhesive of the proximal substratum and the distal substratum are different.

6. A composite decorative vehicle wheel as constructed in accordance with claim 1 wherein the wheel face surface includes mating vent openings and the sheet applique means includes vent openings registered with the wheel face surface vent openings.

7. A composite decorative wheel as constructed in accordance with claim 6 wherein the wheel face surface is contoured and the applique is matingly contoured.

8. A composite decorative vehicle wheel as constructed in accordance with claim 1 wherein the foam stratum means is of a substantially uniform thickness in the order of 0.8 mm.

9. A wheel applique suitable for permanent bonding to an axially outwardly convexly contoured face surface of a vehicle wheel having a rim with an axial peripheral lip to provide a decorative wheel finish, the wheel applique comprising a metal panel, the panel being dimensioned and convexly contoured to conform to the convex contoured shape of the face surface of the stock vehicle wheel without overlying the peripheral lip, the panel having an outer face, the outer face carrying a surface treatment, the panel having an inner face, the applique further including means for permanently adhesively bonding substantially the entire inner face of the panel to the face surface of the wheel, the means for permanently adhesively bonding the applique to the face surface of the stock wheel being adhered to substantially the entire inner face of the panel, the means for permanently adhesively bonding comprising a stratum, the stratum including a foam core and a proximal substratum, the proximal substratum comprising an acrylic adhesive coat covering the core, the proximal substratum being positioned between and adhering the inner face of the panel and the foam core, the stratum further comprising a distal substratum, the distal substratum comprising an acrylic adhesive coat covering the foam core, the applique further including a release film covering the distal substratum.

10. A wheel applique suitable for permanent bonding to the face of a stock vehicle wheel as constructed in accordance with claim 9 wherein the surface treatment comprises a coating of paint.

11. A wheel applique suitable for permanent bonding to the face of a stock vehicle wheel as constructed in accordance with claim 9 wherein the surface treatment comprises a brushed metal finish.

12. A wheel applique suitable for permanent bonding to the face of a stock vehicle wheel as constructed in accordance with claim 9 wherein the surface treatment comprises a chrome plate.

13. A wheel applique suitable for permanent bonding to the face of a stock vehicle wheel as constructed in accordance with claim 9 wherein the metal panel is of a thickness in the order of 0.5 to 0.8 mm and the stratum is of a thickness in the order of 0.8 mm.

14. A wheel applique suitable for permanent bonding to the face of a stock vehicle wheel as constructed in accordance with claim 9 wherein the acrylic adhesive of the proximal substratum coat and the acrylic adhesive of the distal substratum coat are different.

15. A wheel applique suitable for permanent bonding to the face of a stock vehicle wheel as constructed in accordance with claim 9 wherein the core comprises an acrylic foam, the proximal substratum coat comprises DS4 acrylic adhesive and the distal substratum coat comprises AR-7 acrylic adhesive.

16. A wheel applique suitable for permanent bonding to the face of a stock vehicle wheel as constructed in accordance with claim 15 wherein the release film comprises a polyethylene film.

17. A wheel applique suitable for permanent bonding to the face of a stock vehicle wheel as constructed in accordance with claim 16 wherein the stratum is of uniform thickness in the order of 0.8 mm.

18. A method of providing customized surface treatments for vehicle wheels in a new vehicle production line, the method comprising the steps of:

a) providing a plurality of metal appliques as constructed in accordance with claim 9 and dimensioned to be applied against and cover at least a portion of the face surface of a vehicle wheel, the plurality of appliques including appliques with a selection of different surface treatments on the applique outer face surfaces;

b) predesignating a surface treatment for the wheels of successive vehicles in the production line;

c) ascertaining the predesignated surface treatment for the next sequential vehicle in the production line;

d) selecting an applique having the predesignated surface treatment from the plurality of appliques;

e) removing the release film from the selected applique to expose the distal substratum; and f) bonding substantially the entire inner face surface of the selected applique to the face surface of a stock vehicle wheel to provide a composite wheel by compressing the exposed distal substratum against the face surface of the wheel.

19. A method of providing customized surface treatments for vehicle wheels in a new vehicle production line in accordance with claim 18 further including the steps of ascertaining the number of wheels requiring customized surface treatments for the vehicle, the step of selecting including selecting the required number of appliques and the step of bonding including bonding substantially the entire inner face surface of each of the required number of selected appliques to the required number of wheels specified for the vehicle.

20. A method of providing customized surface treatments for vehicle wheels in accordance with claim 18 further including the step of:

g) mounting the composite wheel on the vehicle.

* * * * *